(12) United States Patent
Han et al.

(10) Patent No.: US 9,362,980 B2
(45) Date of Patent: Jun. 7, 2016

(54) GENETICALLY-ENGINEERED MICROBIAL OIL DIELECTRIC FLUID

(75) Inventors: Suh Joon Han, Belle Mead, NJ (US); Brian R. Maurer, Skillman, NJ (US)

(73) Assignee: Dow Global Technologies LLC, Midland, MI (US)

(*) Notice: Subject to any disclaimer, the term of this patent is extended or adjusted under 35 U.S.C. 154(b) by 157 days.

(21) Appl. No.: 14/124,065

(22) PCT Filed: Jun. 25, 2012

(86) PCT No.: PCT/US2012/043973
§ 371 (c)(1),
(2), (4) Date: Dec. 5, 2013

(87) PCT Pub. No.: WO2013/003268
PCT Pub. Date: Jan. 3, 2013

(65) Prior Publication Data
US 2014/0110143 A1 Apr. 24, 2014

Related U.S. Application Data

(60) Provisional application No. 61/501,339, filed on Jun. 27, 2011.

(51) Int. Cl.
*C10M 169/04* (2006.01)
*H01B 17/34* (2006.01)
*H01B 17/36* (2006.01)
*H01B 3/20* (2006.01)
*H04B 3/20* (2006.01)

(52) U.S. Cl.
CPC ............... *H04B 3/20* (2013.01); *C10M 169/04* (2013.01); *C10M 2207/026* (2013.01); *C10M 2207/401* (2013.01); *C10N 2230/24* (2013.01); *C10N 2230/26* (2013.01); *C10N 2230/64* (2013.01); *C10N 2240/201* (2013.01); *C10N 2270/00* (2013.01)

(58) Field of Classification Search
CPC ............ C10M 2207/289; H01B 17/34; C10N 2240/201
USPC ........................ 508/503; 174/30; 252/575, 578
See application file for complete search history.

(56) References Cited

U.S. PATENT DOCUMENTS

| | | | |
|---|---|---|---|
| 6,274,067 B1 * | 8/2001 | Oommen et al. | ............. 252/579 |
| 6,340,658 B1 | 1/2002 | Cannon et al. | |
| 6,726,857 B2 | 4/2004 | Goedde et al. | |
| 7,476,344 B2 | 1/2009 | Sunkara et al. | |

(Continued)

FOREIGN PATENT DOCUMENTS

| | | |
|---|---|---|
| WO | 2007/084769 A2 | 7/2007 |
| WO | 2011/090685 A1 | 7/2011 |
| WO | 2012/061647 A2 | 5/2012 |

OTHER PUBLICATIONS

C.N. Kenyon, Journal of Bacteriology, vol. 109, No. 2, Feb. 1972, p. 827-834.

*Primary Examiner* — Vishal Vasisth
(74) *Attorney, Agent, or Firm* — Whyte Hirschboeck Dudek S.C.

(57) ABSTRACT

The present disclosure provides a dielectric fluid composed of a genetically engineered microbial oil (GEMO) and an antioxidant. The GEMO includes a triglyceride and an amount of small glyceride. The amount of small glyceride is within a range from 0.1 wt % to 30 wt %, based upon the GEMO weight.

15 Claims, 1 Drawing Sheet

(56) References Cited

U.S. PATENT DOCUMENTS

| | | |
|---|---|---|
| 8,097,187 B2 | 1/2012 | Rapp et al. |
| 2009/0035842 A1 | 2/2009 | Trimbur et al. |
| 2009/0053342 A1 | 2/2009 | Streekstra et al. |
| 2009/0140830 A1 | 6/2009 | Amanullah et al. |
| 2010/0105583 A1 | 4/2010 | Garmier |
| 2010/0151112 A1 | 6/2010 | Franklin et al. |
| 2010/0151535 A1 | 6/2010 | Franklin et al. |
| 2010/0151538 A1 | 6/2010 | Franklin et al. |
| 2010/0151539 A1 | 6/2010 | Franklin et al. |
| 2010/0151567 A1 | 6/2010 | Franklin et al. |
| 2010/0243969 A1 | 9/2010 | Rebouillat et al. |
| 2010/0297323 A1 | 11/2010 | Brooks et al. |

* cited by examiner

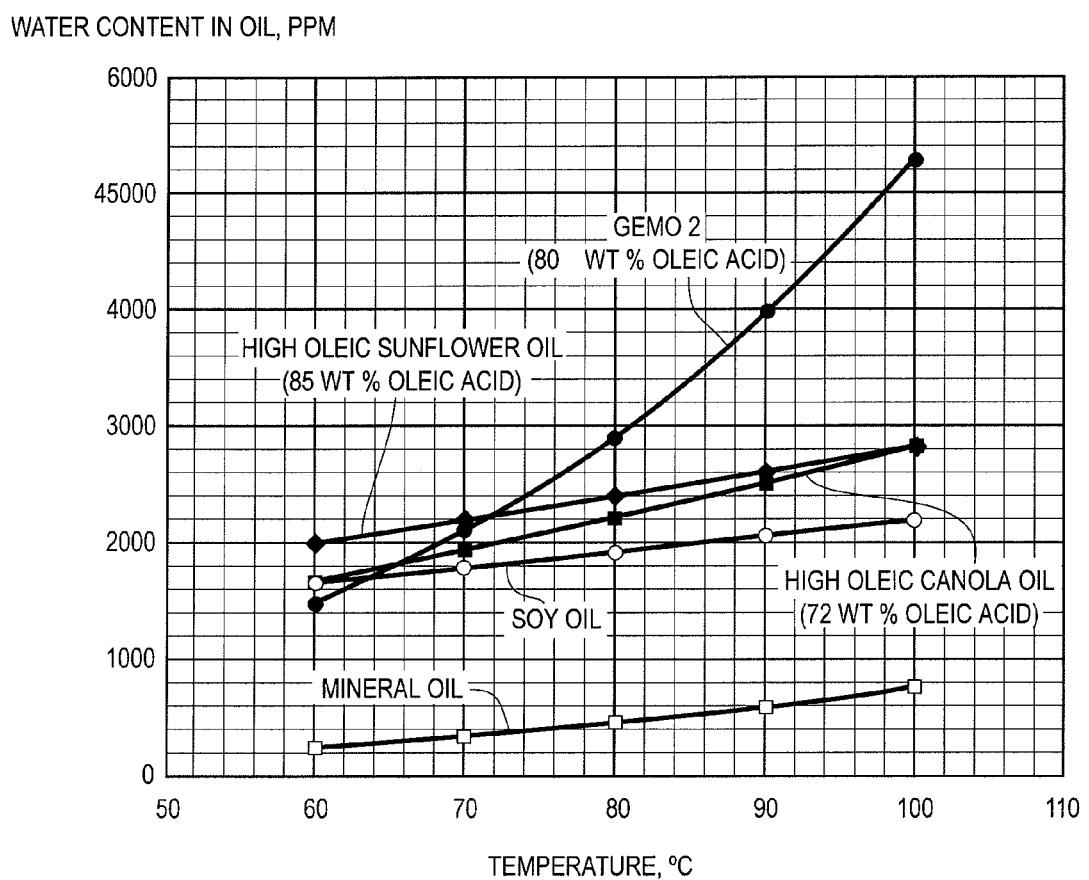

US 9,362,980 B2

GENETICALLY-ENGINEERED MICROBIAL OIL DIELECTRIC FLUID

CROSS REFERENCE TO RELATED APPLICATION

The present application is the national phase of PCT Patent Application No. PCT/US2012/043973 filed Jun. 25, 2012, which claims priority to U.S. Provisional Application No. 61/501,339, filed Jun. 27, 2011, the entire content of which is incorporated by reference herein.

BACKGROUND

Dielectrics are non-conducting fluids used in a variety of applications. The insulative and cooling properties of dielectric fluids find use in electrical components such as transformers, capacitors, switching gears, transmission components, distribution components, switches, regulators, circuit breakers, autoreclosers, fluid-filled transmission lines, and other electrical apparatuses.

In a transformer, the dielectric fluid provides coolant and insulative properties to the internal transformer components. The dielectric fluid cools the transformer and also provides part of the electrical insulation between internal live parts. Requirements for dielectric fluid are a long operating life (10-20 years) and stability at high temperatures for an extended period.

Polychlorinated biphenyl compounds (also known as "PCB's"), once used as dielectric fluid in transformers, have been phased out due to their toxic properties and negative environmental impact. Non-toxic transformer oils that have replaced PCB's include silicone-based or fluorinated hydrocarbon oils, mineral oils, fatty acid esters, vegetable-based oils and vegetable seed oils. These non-toxic oils have drawbacks regarding viscosity, flash point, fire point, pour point, water saturation point, dielectric strength and/or other properties limiting their usefulness as dielectric fluids.

Consequently, a need exists for a non-toxic, biodegradable, PCB-free dielectric fluid for electrical components that have the same, or substantially the same, chemical, mechanical, and/or physical properties as PCB-based dielectric fluid.

SUMMARY

The present disclosure provides a composition. In an embodiment, a dielectric fluid is provided and includes a genetically engineered microbial oil (GEMO) and an antioxidant. The GEMO includes a triglyceride and an amount of small glyceride. In a further embodiment, the amount of small glyceride is within a range from 0.1 wt % to 30 wt %, based upon the GEMO weight.

The present disclosure provides a device. In an embodiment, a device is provided and includes an electrical component and a dielectric fluid in operative communication with the electrical component. The dielectric fluid includes the GEMO and an antioxidant. In a further embodiment, the GEMO includes a triglyceride and an amount of small glyceride. The amount of small glyceride is within a range from 0.1 wt % to 30 wt %, based upon the GEMO weight.

An advantage of the present disclosure is an improved dielectric fluid.

An advantage of the present disclosure is a dielectric fluid that is biodegradable.

An advantage of the present disclosure is a dielectric fluid made from a renewable/sustainable source, namely microorganisms.

An advantage of the present disclosure is oil produced from a genetically engineered microorganism, the genetics of the microorganism being tailored to produce an oil with properties suitable for use as a dielectric fluid.

An advantage of the present disclosure is a genetically engineered microbial oil that is tailored to increase the amount of oleic acid; and decrease the amounts of linoleic acid and/or linolenic acid, and comprises oligosaccharide.

An advantage of the present disclosure is a genetically engineered microbial oil that is tailored to produce increased amounts of small glyceride compared to the amount of small glyceride present in natural microbial oil.

An advantage of the present disclosure is a genetically engineered microbial oil with an increased water saturation point at 75° C.-100° C.

BRIEF DESCRIPTION OF THE DRAWING

FIG. 1 is a graph showing the water saturation point vs. temperature of the present GEMO compared to conventional oils.

DETAILED DESCRIPTION

A dielectric fluid performs two major functions. First, dielectric fluids serve as electrical insulation in an electrical component. The dielectric fluid should be capable of withstanding high voltages present in an electrical component such as a transformer, for example. Second, dielectric fluids function as a heat transfer media to dissipate heat generated within the electrical component. The dielectric fluid may also reduce the corrosive effects of oxygen and moisture. Thus, dielectric fluids require good electrical properties while simultaneously being resistant to thermal oxidation and degradation.

Dielectric fluids require several fundamental properties which are contrary to the natural properties of vegetable oils and seed oils. These properties are oxidation stability, dielectric constant, low pour point, resistance to sludge formation, and resistance to formation of acids.

The present disclosure provides a dielectric fluid. In an embodiment, a dielectric fluid is provided and includes a microbial oil and an antioxidant. The microbial oil is an oil produced by a microorganism genetically engineered to produce an oil that meets the requirements for a dielectric fluid. In a further embodiment, the genetically engineered microbial oil includes a triglyceride and an amount of a small glyceride and/or an amount of an oligosaccharide.

1. Genetically Engineered Microbial Oil

The present dielectric fluid contains a genetically-engineered microbial oil. A "genetically-engineered microbial oil," or "GEMO," as used herein, is an oil produced by one or more strains of microorganism containing one or more exogenous genes. The microorganism is microalgae, oleaginous yeast, bacteria, and/or fungi. The exogenous gene(s) encode(s) enzyme(s) that produce desired lipids and/or fatty acids in the cells of the microorganism.

An "exogenous gene," as used herein, is a nucleic acid transformed into a cell. A transformed cell may be referred to as a recombinant cell, into which additional exogenous gene(s) may be introduced. The exogenous gene may be from a different species (and so heterologous), or from the same species (and so homologous) relative to the cell being transformed. In the case of a homologous gene, it occupies a different location in the genome of the cell relative to the endogenous copy of the gene. The exogenous gene may be present in more than one copy in the cell. The exogenous gene may be maintained in a cell as an insertion into the genome or as an episomal molecule.

The exogenous gene(s) is/are selected to encode desired enzymes. The enzymes correspondingly produce desired components (fatty acids) and/or desired properties (desired carbon chain length, desired amount of saturated/unsaturation in the final oil. By selecting the desired combination of exogenous genes to be expressed, one can tailor the product generated by the microorganism. In this way, the microorganism is genetically tailored to produce an oil with a compositional profile suitable for a dielectric fluid. The microorganism may be genetically engineered or otherwise tailored to produce an oil with a desired lipid and/or fatty acid content, and/or a desired degree of saturation/unsaturation, and/or a desired amount of small glyceride and/or oligosaccharide.

For example, the microorganism may be engineered to synthesize a fatty acid and through further enzymatic processing is cleaved to a desired carbon length. The fatty acid may then be further enzymatically processed to a desired saturation or unsaturation. The microorganism metabolism may also be enzymatically processed to produce a desired amount of oligosaccharide.

In an embodiment, the microorganism is a microalgae. The microalgae are engineered to increase cell metabolism for fatty acid synthesis. The microalgae contain one or more exogenous genes to encode one or more of the nonlimiting enzymes set forth in Table 1 below.

TABLE 1

Enzymes for Fatty Acid Synthesis

| Enzyme | Function |
| --- | --- |
| pyruvate dehydrogenase | produces acetyl-CoA, and thereby increases fatty acid synthesis |
| acetyl-CoA carboxylase | catalyzes the initial step in fatty acid synthesis |
| acyl carrier protein (ACP) | carries the growing acyl chains during fatty acid synthesis |
| glycerol-3-phosphate acyltransferase | catalyzes the rate-limiting step of fatty acid synthesis |
| citrate synthase | consumes acetyl-CoA as part of the tricarboxylic acid (TCA) cycle; down-regulation of citrate synthase can force more acetyl-CoA into the fatty acid synthetic pathway |
| global regulators of fatty acid synthesis | modulates the expression of the genes of the fatty acid biosynthetic pathways (sterol regulatory element binding proteins (SREBPs)) |

The microalgae may include transforming cells with one or more genes encoding hydrocarbon modification enzymes as set forth in Table 2 below.

TABLE 2

Hydrocarbon Modification Enzymes
Enzyme fatty acyl-ACP thioesterase
fatty acyl-CoA/aldehyde reductase
fatty acyl-CoA reductase
fatty aldehyde decarbonylase
fatty aldehyde reductase
squalene synthase gene
stearoyl-ACP desaturase The enzymes shown in Table 2 have a specificity for acting on a substrate which includes a specific number of carbon atoms. For example, a fatty acyl-ACP thioesterase may have a specificity for cleaving a fatty acid with a desired carbon length from the ACP. Alternatively, the ACP and the length-specific thioesterase may have an affinity for one another that makes them particularly useful as a combination (i.e., the exogenous ACP and thioesterase genes may be naturally co-expressed in a particular tissue or organism from which they are derived). Thus, the microalgae can contain an exogenous gene that encodes a protein with specificity for catalyzing the cleavage of a fatty acid from an ACP with regard to the number of carbon atoms contained in the substrate. The enzymatic specificity can be for a substrate having from 8, or 10, or 14 to 16 or 18, or 20, or 22, or 24 carbon atoms, or any combination thereof. In a further embodiment the specificity is for a substrate having 16 to 20 carbon atoms. In yet a further embodiment, the specificity is for a substrate having 18 carbon atoms.

In an embodiment, the microorganism is genetically-engineered to produce functionalized fatty acids. Nonlimiting examples of functional groups are enzymatically processed onto the fatty acid include epoxy, hydroxyl, amine, carboxylic, ketone, aldehyde, alkenyl, aryl, allyl, squalenic, and alkyl groups.

In an embodiment, the microalgae are from the genus *Chorella*. *Chlorella* is a genus of single-celled green algae, belonging to the phylum Chlorophyta. It is spherical in shape, about 2 to 10 μm in diameter, and is without flagella. Some species of *Chlorella* are naturally heterotrophic. Nonlimiting examples of suitable species of *Chlorella*, include *Chlorella protothecoides*, *Chlorella minutissima*, *Chlorella sorokiniana*, *Chlorella elhpsoidea*, *Chlorella* sp., and *Chlorella emersonii*.

In an embodiment, the microalgae are *Chlorella protothecoides*. It has been found that *Chlorella protothecoides* is particularly adapted for dielectric fluid production because of its high composition of lipid and long-chain lipid in particular.

In an embodiment, the microalgae are from the genus *Chlorella* and are heterotrophically grown. The carbon source is selected from fructose, sucrose, galactose, xylose, mannose, rhamnose, N-acetylglucosamine, glycerol, floridoside, glucuronic acid, and any combination thereof. Heterotrophic growth conditions can be adjusted to increase the yield of lipids suitable for dielectric fluid. For example, acetic acid can be employed in the feedstock for the microalgae. Acetic acid feeds directly into the point of metabolism that initiates fatty acid synthesis (i.e., acetyl-CoA); thus providing acetic acid in the culture can increase fatty acid production. Generally, the microbe is cultured in the presence of a sufficient amount of acetic acid to increase microbial lipid yield, and/or microbial fatty acid yield, specifically, over microbial lipid (e.g., fatty acid) yield in the absence of acetic acid.

A fermentor can be used as the heterotrophic growth medium. The medium may be stirred and/or agitated during fermentation to promote aeration. Upon completion of fermentation, harvest may occur by way of centrifugation, filtration, precipitation, extraction, lysing, and any combination thereof. The resulting oil may be purified by further refinement, bleaching and/or drying.

In an embodiment, the heterotrophically grown microalgae are genetically-engineered to enzymatically process the carbon source and produce a small glyceride. A "small glyceride," as used herein, is a glycerol molecule covalently bonded to at most two fatty acid chains by way of ester linkages. In other words, a small glyceride is a glycerol molecule esterified with one fatty acid or two fatty acids to form monoglyceride, diglyceride, and combinations of monoglyceride and diglyceride. The fatty acid moiety of the small glyceride contains a $C_8$ to $C_{24}$ carbon chain and can be saturated or unsaturated. A small glyceride excludes triglyceride—namely, glycerol esterified with three fatty acids.

In an embodiment, the GEMO contains greater than or equal to 0.1 wt %, or greater than or equal to 1.0 wt %, or greater than or equal to 5 wt %, or greater than or equal to 10 wt %, to 20 wt %, or 30 wt %, or more of small glyceride. The small glyceride may be monoglyceride, diglyceride, or a combination thereof. Weight percent is based on the total weight of the GEMO.

In an embodiment, the small glyceride is present in an amount from 0.5 wt % to 1.0 wt % of the GEMO. The small glyceride includes from 0.01 wt % to 0.1 wt % monoglyceride and from 0.99 wt % to 0.9 wt % diglyceride. In a further embodiment, the small glyceride includes from 0.01 wt % to 0.05 wt % monoglyceride and from 0.8 wt % to 0.85 wt % diglyceride, the small glyceride being 0.81 wt % to 0.90 wt % of the GEMO. Bounded by no particular theory, it is believed that as the amount of small glyceride increases, the water saturation point of the GEMO correspondingly increases.

Natural microorganisms, such as natural algae for example, may produce an oil with up to about 100 ppm (0.01 wt %) small glyceride. The present GEMO is advantageous as it is engineered to produce more small glyceride than the small glyceride produced by natural (i.e., non-genetically-engineered) microorganisms.

Provision of the small glyceride in the present GEMO carries additional advantages. Small glyceride has a lower molecular weight than triglyceride. As a general rule, as the molecular weight of a glyceride decreases, so too does the viscosity decrease. Consequently, small glyceride may reduce the overall viscosity of the GEMO. The lower the viscosity of the oil, the more efficient is the oil for heat-transfer (as in transformer operation, for example) as cooling and heat dissipation is based on convection. Thus, the small glyceride can act as a viscosity reducing ingredient in the GEMO/dielectric fluid.

Second, small glyceride (i.e., monoglyceride and/or diglyceride) is a surface active molecule that simultaneously attracts and repels water. This simultaneous hydrophilic/hydrophobic property makes small glyceride an excellent emulsifying agent for capturing any impurities present in the dielectric fluid. Small glyceride also controls hydrogen bond formation (i.e., —OH group of diglyceride is attracted to —OH group of water). Small glyceride may serve as a dehydration agent to absorb any moisture in the oil and/or any moisture produced by cellulose paper insulation system in a transformer, for example.

In an embodiment, the heterotrophically grown microalgae are genetically-engineered to enzymatically process the carbon source and produce one or more oligosaccharides. An "oligosaccharide," as used herein, is a molecule composed of two or more monosaccharides covalently linked to each other through glycosidic bonds. In an embodiment, the oligosaccharide contains 2, or 3, or 4, or 5, or 6, or 7, or 8 to 10 or more monosaccharides. In a further embodiment, the heterotrophic microalgae are genetically engineered to produce a final oil having from 0.1 ppm, or 1 ppm, or 5 ppm to 10 ppm, or 100 ppm, or 1000 ppm, or 10,000 ppm, or 50,000 ppm oligosaccharide.

The oligosaccharide has the structure (I) below.

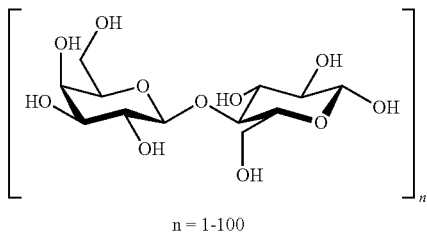

n = 1-100

Provision of the oligosaccharide in the present GEMO carries several advantages. First, the oligosaccharide is a dehydration agent. The oligosaccharide has the capability to absorb any moisture in the dielectric fluid in transformer. The oligosaccharide is also capable of absorbing any moisture that migrates into the dielectric fluid from the electrical component including cellulose paper insulation. The oligosaccharide absorbs moisture quickly. Bounded by no particular theory, it is believed that the hydroxyl groups of the oligosaccharide hydrogen bond with water, thereby dehydrating the dielectric fluid. In an embodiment, the oligosaccharide (or derivatives thereof), in anionic form, can absorb from 100, or 200 to 300 times its own weight in water.

Second, the oligosaccharide also advantageously functions as a pour point depressant. Bounded by no particular theory, the presence of the oligosaccharide in the oil induces the oil not to form above the critical size for nucleation and growth of crystal as well as crystallization transition temperature. In this way, the oligosaccharide inhibits formation of large crystals at low temperature, and lowers the pour point of the dielectric fluid.

In an embodiment, the microalgae is genetically engineered to produce a final oil that contains at least 60 wt %, or from at least 60 wt %, or 65 wt %, or 70 wt %, or 75 wt %, or 80 wt %, or 85 wt % to 90 wt %, or 95 wt % or 99 wt % oleic acid; less than 15 wt % or from 0.5 wt %, or 1 wt %, or 2 wt %, or 3 wt % to 5 wt %, or 10 wt %, or less than 15 wt % linoleic acid; and less than 5 wt % or from 0 wt %, or 0.25 wt %, or 0.5 wt %, or 1 wt %, or 2 wt % to 3 wt %, or 4 wt %, to less than 5 wt % linolenic acid. The GEMO may contain oleic acid, linoleic acid, and linolenic acid in any combination of weight percents set forth above. Weight percent is based on the total weight of the GEMO.

In an embodiment, the GEMO contains greater than 65 wt % oleic acid, less than 15 wt % linoleic acid, and less than 5 wt % linolenic acid. Weight percent is based on the total weight of the GEMO.

In an embodiment, the GEMO contains greater than 80 wt % oleic acid, or greater than 80 wt % to 85 wt % oleic acid; less than 10 wt %, or from 5 wt % to 10 wt % linoleic acid; and less than 1 wt %, or 0 wt %, or greater than 0 wt %, or 0.1 wt % to 0.3 wt % linoleic acid.

In an embodiment, the microalgae is genetically engineered to produce a GEMO having a monounsaturated fatty acid content from at least 60 wt %, or from at least 60 wt %, or 65 wt %, or 70 wt %, or 75 wt %, or 80 wt %, or 85 wt % to 90 wt %, or 95 wt % or 99 wt % and a polyunsaturated fatty acid content less that 15 wt %, or from 0 wt %, or 0.5 wt %, or 1 wt %, or 2 wt %, or 3 wt % to 5 wt %, or 10 wt %, or less than 15 wt %. Weight percent is based on the total weight of the GEMO.

In an embodiment, the GEMO has a triglyceride content from 85%, or 90% to 95%, or 96%, or 97%, or 98%, or 99%, or 99.9%. The small glyceride is present from 0.1 wt %, or 1.0 wt %, or 5 wt % to 10 wt %, or 20 wt %, or 30 wt %. Weight percent is based on the total weight of the GEMO.

In an embodiment, the microorganism is genetically engineered to produce one or more heterogeneous triglyceride(s). A "heterogeneous triglyceride," as used herein, is a triglyceride with the structure (II) below:

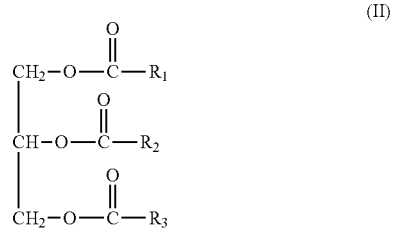

wherein $R_1$, $R_2$, and $R_3$ are the same or different. Each of $R_1$, $R_2$, $R_3$ has a carbon chain length from 8 carbon atoms to 24 carbon atoms. At least two, or at least three, of $R_1$, $R_2$, $R_3$ have a different number of carbon atoms, or different branching, or a different degree of saturation/unsaturation.

In an embodiment, at least one of $R_1$, $R_2$, $R_3$ of the heterogeneous triglyceride of structure (II) has a carbon chain of 16 carbon atoms (i.e., at least one of the $R_1$-$R_3$ has a fatty acid moiety with a $C_{16}$ carbon chain). The other two $R_1$, $R_2$, $R_3$ have a chain length from 8 carbon atoms to 24 carbon atoms with at least one of the remaining two R groups not having a carbon chain of 16 carbon atoms.

In an embodiment, at least one of $R_1$, $R_2$, $R_3$ of structure (II) has a carbon chain with 18 carbon atoms. The other two of $R_1$, $R_2$, $R_3$ each have a chain length with a different number of carbon atoms. The present GEMO provides the ability to genetically engineer the microorganism and produce an oil composed of heterogeneous triglyceride suitable for use as a dielectric fluid. Thus, each of $R_1$-$R_3$ may have a different length with at least one of $R_1$-$R_3$ having a $C_{18}$ carbon chain.

In an embodiment, the GEMO has a heterogeneous triglyceride content from 85%, or 90% to 95%, or 96%, or 97%, or 98%, or 99%, or 99.9%. Weight percent is based on the total weight of the GEMO.

Applicant has surprisingly discovered that the presence of the small glyceride in the GEMO increases the water saturation point for the present dielectric fluid. As shown in FIG. 1, the water saturation capacity of the present dielectric fluid increases a factor of 4× to 5× as the temperature moves from 60° C. to 75° C.-100° C. (conventional transformer operating temperature). The GEMO in FIG. 1 represents the GEMO 2 in the Examples section and has a small glyceride content of 0.84 wt % (0.01 wt % monoglyceride and 0.83 wt % diglyceride). The water saturation point of FIG. 1 is determined in accordance with ASTM D 1533. Compared to the water saturation point of conventional oils (mineral, high oleic sunflower, high oleic canola, soy), the exponential increase in water saturation capacity at 100° C. of the present GEMO is surprising and unexpected.

Bounded by no particular theory, it is believed that as the GEMO in the dielectric fluid degrades, the small glyceride and/or the oligosaccharide present in the GEMO absorbs the moisture, thereby preventing water from condensing out of the dielectric fluid. In this way, the small glyceride and/or the oligosaccharide are/is a dehydration agent, thereby increasing the water saturation capacity of the present dielectric fluid.

In an embodiment, the present dielectric fluid has a water saturation from 1400 ppm to 1600 ppm at 60° C. In a further embodiment, the amount of small glyceride is from 0.1 wt % to 1.0 wt % in the dielectric fluid with water saturation range of 1400-1600 ppm at 60° C.

In an embodiment, the present dielectric fluid has a water saturation from 2000 ppm to 2200 ppm at 70° C. In a further embodiment, the amount of small glyceride is from 0.1 wt % to 1.0 wt % in the dielectric fluid with water saturation range of 2000-2200 ppm at 70° C.

In an embodiment, the present dielectric fluid has a water saturation from 2800 ppm to 3000 ppm at 80° C. In a further embodiment, the amount of small glyceride is from 0.1 wt % to 1.0 wt % in the dielectric fluid with water saturation range of 2800-3000 ppm at 80° C.

In an embodiment, the present dielectric fluid has a water saturation from 3800 ppm to 4200 ppm at 90° C. In a further embodiment, the amount of small glyceride is from 0.1 wt % to 1.0 wt % in the dielectric fluid with water saturation range of 3800-4200 ppm at 90° C.

In an embodiment, the present dielectric fluid has a water saturation from 4800 ppm to 5600 ppm at 100° C. In a further embodiment, the amount of small glyceride is from 0.1 wt % to 1.0 wt % in the dielectric fluid with water saturation range of 5000-5600 ppm at 100° C.

The present dielectric fluid may have one, some, or all of the aforementioned water saturation points at the respective temperatures.

2. Antioxidant

The present dielectric fluid contains an antioxidant. The antioxidant improves the oxidative stability of the dielectric fluid. In an embodiment, the antioxidant is a phenolic antioxidant or an amine antioxidant. Nonlimiting examples of suitable phenolic anti-oxidants such as IRGANOX L109, IRGANOX L64, IRGANOX L94, and alkylated diphenylamines, commercially sold as IRGANOX L-57 available from CIBA SPECIALTY CHEMICALS, Inc. (Tarrytown, N.Y.), a high molecular weight phenolic antioxidant, such as bis(3,5-di-tert-butyl-4-hydroxyhydrocinnamate, bis(2,6-di-tert-butylphenol derivative, commercially sold as IRGANOX L-109, also from CIBA SPECIALTY CHEMICALS, VANOX MBPC, 2,2'-methylene-bis(4-methyl-6-tert-butylphenol), which is commercially available from R.T. Vanderbilt Company, Inc., IRGANOX L-109, bis(3,5-di-tert-butyl-4-hydroxyhydrocinnamate, di-tert-butyl-para-cresol, 2,6-di-tert-butyl-methyl phenol, 2,4-dimethyl-6-tert-butyl phenol, and any combination thereof.

Nonlimiting examples of amine antioxidant include substituted, diphenyl amine antioxidant N,N' dioctyldiphenylamine, di-β-naphtyl-para-phenylenediamine, reaction products of n-phenylbenzenamine and 2,4,4-trimethylpentane (IRGANOX L-57), nonylated diphenylamine (Naugalube 438L), butyl octyl diphenyl amine, dialkyl diphenylamine (IRGANOX L-74), and dicumyl diphenyl amine, N,N'-di-isopropyl-para-phenylenediamine, N,N'-bis-(1,4-dimethylphenyl)-para-phenylenediamine, and combinations thereof.

Further nonlimiting examples of other suitable antioxidants include butylated hydroxy toluene (BHT), butylated hydroxy anisole (BHA), mono-tertiary butyl hydro quinone (TBHQ), and any combination thereof. Oxidation stability tests for dielectric fluid vary based on the use of the dielectric fluid. For example, dielectric fluid for sealed transformer systems, conservators, and free-breathing apparatus each may have a different oxidation stability test. One common test is the oxygen stability index method (AOCS official method Cd 12b-92). In this method, a stream of purified air is passed through a sample of oil, which is held in a thermal bath. The effluent air from the oil sample is then bubbled through a vessel containing deionized water. The conductivity of the water is continuously monitored. Any volatile organic acids from the oil sample are swept by the effluent air. The presence of the volatile organic acids in the effluent air increases the conductivity of water as oxidation proceeds. The oil stability index is defined as the point of maximum change of the rate of oxidation.

Further nonlimiting examples of other suitable antioxidants include 2,2-di(4-hydroxyphenyl) propane, phenolthiazine, phenolthizazine carboxylic esters, polymerized trimethyldihydroquinoline, phenyl-α-naphtylamine, N,N' dioctyldiphenylamine, N,N'-diisopropyl-p-phenyldiamine, dibutyl cresol, butylated hydroxyanisoles, anthraquinone, quinoline, pyrocatechol, di-β-naphtyl-para-phenylenediamine, propylgallate, 1,3,5-trimethyl-2,4,6-tris(3,5-di-tert-butyl-4-hydroxybenzyl)benzene, tris(2,4-ditert-butylphenyl) phosphite, bis(1,2,2,6,6-pentamethyl-4-piperidyl) sebacate, tetrakis[methylene(3,5-di-t-butyl-4-hydroxyhydrocinnamate)]methane, thiodiethylene bis(3,5-di-tert-butyl-4-hydroxyhydrocinnamate, 4,4'-thiobis(6-tert-butyl-m-cresol), 2,2'-thiobis(6-t-butyl-4-methylphenol), 2,2'-methylenebis(4-methyl-6-tert-butylphenol), benzenamine, 4-(1-methyl-1-phenylethyl)-N-4[4-(1-methyl-1-phenylethyl)phenyl]-, taxilic acid, citric acid, and any combination of the foregoing. In an embodiment, the present dielectric fluid contains from 0.1 wt % to 1.0 wt %, or 1.5 wt % anti-oxidant. Weight percent is based on total weight of the dielectric fluid.

3. Additives

The present dielectric fluid may include one or more of the following additives: an oxidation inhibitor, a corrosion inhibitor, a metal deactivator, a pour point depressant, and any combination thereof.

In an embodiment, the dielectric fluid includes a metal deactivator. The metal deactivator improves the oxidative stability of the dielectric fluid. Nonlimiting examples of suitable metal deactivators include copper deactivator and aluminum deactivator. Copper has a catalytic effect in the oxidation of oil. The antioxidants react with free oxygen thereby preventing the latter from attacking the oil. A copper deactivator such as benzotriazole derivatives reduces the catalytic activity of copper in the dielectric fluid. In an embodiment, the dielectric fluid contains less than 1 wt % of a copper deactivator. IRGAMET-30 is a commercially available metal deactivator from CIBA SPECIALTY CHEMICALS and is a triazole derivative, N,N-bis(2-Ethylhexyl)-1H-1,2,4-triazole-1 methanamine.

Nonlimiting examples of other suitable metal deactivators include 2',3-bis[[3-[3,5-di-tert-butyl-4-hydroxyphenyl]propionyl]]proponiohydrazine, benzo-triazole fatty amine salt, 1-(di-isooctylaminomethyl)-1,2,4-triazole, 1-(2-methoxyprop-2-yl)tolyltriazole, 1-(1-cyclohexyloxypropyl)tolyltriazole, 1-(1-cyclohexyloxyheptyl)tolyltriazole, 1-(1-cyclohexyloxybutyl)tolyltriazole, 1-[bis(2-ethylhexyl) aminomethyl-4-methylbenzotriazole, triethyl borate, tripropyl borate, triisopropyl borate, tributyl borate, tripentyl borate, trihexyl borate, tricyclohexyl borate, trioctyl borate, triisooctyl borate, and N,N-bis(2-Ethylhexyl)-ar-methyl-1H-benzotriazole-1-methanamine. In an embodiment, the present dielectric fluid includes 0.1 wt % to less than 0.7%, or less than 1.0 wt % metal deactivator (based on the total weight of the dielectric fluid).

The oligosaccharide produced by genetically engineered microalgae functions as a pour point depressant as previously discussed. The pour point of the present dielectric fluid can be further improved either by addition of another pour point depressant to the dielectric fluid composition and/or winterization of the dielectric fluid composition. In an embodiment, the pour point depressant is a branched polymethacrylate. Polymethacrylate has a backbone which encourages inclusion of the pour point depressant molecule into a growing crystal of the GEMO in the dielectric fluid. By interfering with wax crystal growth patterns, the pour point depressant increases the operational range of the present dielectric fluid composition so it remains fluid at much lower temperatures. Nonlimiting examples of suitable pour point depressants include methacrylic acid ester, polyalkyl methacrylate, fatty acid alkyl esters from fatty acids, polyvinyl acetate oligomers, acrylic oligomers, VISCOPLEX 10-310, VISCOPLEX 10-930, and VISCOPLEX 10-950. In an embodiment, the pour point depressant is a polymethacrylate (PMA).

In an embodiment, the pour point may be further reduced by winterizing the dielectric fluid. "Winterization" is the process of removing sediment which appears in the GEMO at low temperatures. The sedimentation is accompanied with a decrease in the oil's viscosity. Winterization may be performed by reducing the temperature serially to 5° C., 0° C. and −12° C. for several hours, and filtering the solids with diatomaceous earth.

In an embodiment, the dielectric fluid may include the GEMO, a blend component and the antioxidant. The blend component may be one or more of the following: a vegetable oil, a seed oil, a mineral oil, a silicone fluid, a synthetic ester, a poly alpha olefin, and combinations thereof.

4. Properties

The present GEMO has specific physical properties which makes it suited for use as a dielectric fluid.

The dielectric strength of the present dielectric fluid containing GEMO is at least 20 kV/mm (1 mm gap), or at least 35 kV (2.5 mm gap) or at least 40 KV/100 mil (2.5 mm) gap as measured in accordance with ASTM D 1816.

The dissipation factor for the present dielectric fluid containing GEMO is less than 0.5% at 25° C., less than 0.2%, or less than 0.1% as measured in accordance with ASTM D 924.

The acidity for the present dielectric fluid containing GEMO is less than 0.06 mg KOH/g, or less than 0.03 mg KOH/g, or less than 0.02 mg KOH/g as measured in accordance with ASTM D 974.

The electrical conductivity for the present dielectric fluid containing GEMO is less than 1 pS/m at 25° C. or less than 0.25 pS/m as measured in accordance with ASTM D 2624.

The flash point for the present dielectric fluid containing GEMO is at least 145° C., or at least 200° C., or at least 250° C., or at least 300° C. as measured in accordance with ASTM D 92.

The fire point temperature for the present dielectric fluid containing GEMO is at least 300° C. as measured in accordance with ASTM D 92.

The pour point for the present dielectric fluid containing GEMO is less than −10° C., or less than −15° C., or less than −20° C. or less than −30° C. as measured in accordance with ASTM D 97.

The present dielectric fluid has an initial water content less than 200 ppm, or from 0 ppm, or 10 ppm, to 100 ppm, or less than 200 ppm as measured in accordance with ASTM D 1533.

The present dielectric fluid is free, void, or otherwise devoid of PCB. In other words, the amount of PCB (if any) present in the dielectric fluid is not detectable by way of ASTM D 4059.

In an embodiment, the present dielectric fluid has a viscosity less than about 50 cSt at 40° C. and less than 15 cSt at 100° C. as measured in accordance with ASTM D 445 (Brookfield).

The present dielectric fluid may have any combination of the foregoing properties.

5. Device

The present disclosure provides a device. The device includes an electrical component and the present dielectric fluid is in operative communication with the electrical component. The present dielectric fluid includes the GEMO with triglyceride (optionally with small glyceride and/or oligosaccharide) and an antioxidant. Nonlimiting examples of suitable electrical components include a transformer, a capacitor, a switching gear, a transmission component, a distribution component, a switch, a regulator, a circuit breaker, an autorecloser, or like components, a fluid-filled transmission line, and/or combinations thereof.

The dielectric fluid is in operative communication with the electrical component. As used herein, "operative communication" is a configuration and/or a spatial relationship enabling the dielectric fluid to cool and/or insulate the electrical component. Operative communication thereby includes direct and/or indirect contact between the dielectric fluid and the electrical component by way of the following configurations: dielectric fluid, in, on, around, adjacent to, contacting, surrounding (wholly or partially) through, and/or in proximity to the electrical component; and the electrical component immersed (wholly or partially) in the dielectric fluid.

In an embodiment, the dielectric fluid is in operative communication with the electrical component and the GEMO includes from 0.1 wt % to 30 wt % small glyceride.

In an embodiment, the dielectric fluid is in operative communication with the electrical component and the GEMO includes from 0.1 wt % to 1.0 wt % small glyceride and the dielectric fluid has a water saturation point from 3800 ppm to 4200 ppm at 90° C. as measured in accordance with ASTM D 1533.

In an embodiment, the dielectric fluid is in operative communication with the electrical component and the GEMO includes 0.1 wt % to 1.0 wt % small glyceride and the dielectric fluid has a water saturation from 4800 ppm to 5600 ppm at 100° C.

In an embodiment, the dielectric fluid is in operative communication with the electrical component and the GEMO includes from 0.1 ppm to 50,000 ppm of the oligosaccharide. In a further embodiment, the dielectric fluid includes a blend component.

In an embodiment, the dielectric fluid is an operative communication with the electrical component and the GEMO includes 0.1 wt % to 30 wt % small glyceride and from 0.1 ppm to 50,000 ppm of the oligosaccharide.

In an embodiment, the electrical component includes a cellulose-based insulation material. Nonlimiting examples of suitable cellulose-based insulation material include kraft paper and/or pressboard.

It is known that water present in dielectric fluid degrades the cellulose-based insulation material. As the saturation point of the dielectric fluid is reached, residual water in contact with the cellulose-based insulation material hydrolyzes the cellulose fibers and degrades the insulation material. The small glyceride present in the GEMO absorbs moisture thereby reducing degradation of the cellulose-based insulation material. In this way, the presence of the small glyceride increases the life span of both the GEMO and the cellulose-based insulation material which correspondingly increases the service life of the device.

In an embodiment, the device includes dielectric fluid in contact with the cellulose-based insulation material. The dielectric fluid has water saturation points at respective temperatures 60° C., 70° C., 80° C., 90° C., and 100° C. as previously disclosed. In a further embodiment, the dielectric fluid in contact with the cellulose-based insulation material has a water saturation point from 4800 ppm to 5600 ppm at 100° C.

In an embodiment, the electrical component is a transformer. The present dielectric fluid composed of the GEMO is in operative communication with the transformer. In the transformer, the present dielectric fluid provides (1) a liquid coolant that dissipates heat energy generated by the transformer operation and/or (2) an insulator between internal live parts that prevents electrical components from contacting or arcing over the transformer. The dielectric fluid is present in an effective amount to insulate the electrical component. The dielectric fluid also retards the degradation of insulation paper made from cellulose-based insulation material. The life span of the transformer is typically determined by the life of the insulation paper. The small glyceride and/or the oligosaccharide present in the dehydration agent controls the moisture of the insulation paper as well as the moisture in the dielectric fluid. By preserving the insulation paper, the present dielectric fluid advantageously increases the life span of the transformer.

In an embodiment, the transformer is a distribution transformer. A distribution transformer includes primary and secondary coils or windings in a housing or a tank and a dielectric fluid in the tank in operative communication with the windings. The windings are insulated from each other, via the dielectric fluid, and are wound around a common core of magnetically suitable material, such as iron or steel. The core and/or the windings may also have laminations, insulative coatings or insulation paper materials to further insulate and absorb heat. The core and windings are immersed in the dielectric fluid, allowing free circulation of the fluid. The dielectric fluid covers and surrounds the core and windings. The dielectric fluid completely fills all small voids in the insulation and elsewhere within the housing. The transformer housing provides an air-tight and fluid-tight seal around the tank preventing ingress of air and/or contaminants which may collect and eventually cause failure of the transformer. A distribution transformer has a system voltage typically in the range of 36 kV or less.

In an embodiment, the electrical component is a power transformer. A power transformer has a system voltage typically in the range of 36 kV or greater.

In order to improve the rate of heat transfer from the core and coil assembly, the transformer may include additional structures for providing increased cooling, such as fins on the tank that are provided to increase the surface area available to provide cooling, or radiators or tubes attached to the tank that are provided so that the hot fluid that rises to the top of the tank may cool as it circulates through the tubes and returns at the bottom of the tank. These tubes, fins or radiators provide additional cooling surfaces beyond those provided by the tank walls alone. Fans may also be provided to force a current of air to blow across the heated transformer enclosure, or across radiators or tubes to better transfer the heat from the hot dielectric fluid and heated tank to the surrounding air. Also, some transformers include a forced oil cooling system which includes a pump to circulate the dielectric fluid from the bottom of the tank through pipes or radiators to the top of the tank (or from the tank to a separate and remote cooling device and then back to the transformer).

Other embodiments are also possible and are not limited to use in a transformer.

The present dielectric fluid is biodegradable and is non-toxic. Biodegradability eases disposal of the present dielectric fluid and eliminates hazards in the event the dielectric fluid is spilled onto the earth or surfaces in the vicinity of the transformer's location.

In an embodiment, the present disclosure provides a process that includes placing the present dielectric fluid in operative communication with an electrical component. The dielectric fluid is the present dielectric fluid containing the GEMO with triglyceride (which optionally includes the small glyceride and/or the oligosaccharide), an antioxidant, and optionally a blend component. The process further includes cooling the electric component with the present dielectric fluid. The electrical component may include any one of a transformer, a capacitor, a switching gear, a power cable, a distribution component (such as an oil-filled distribution cable), a switch, a regulator, a circuit breaker, an autorecloser, fluid-filled transmission line, and/or combinations thereof.

In an embodiment, the present disclosure provides a process that includes placing a dielectric fluid in operative communication with an electrical component. The dielectric fluid is the present dielectric fluid with the GEMO (which optionally includes the oligosaccharide), and optionally a blend component. The process further includes insulating the electric component with the dielectric fluid. The electrical component may include any one of a transformer, a capacitor, a switching gear, a power cable, a distribution component (such as an oil-filled distribution cable), a switch, a regulator, a circuit breaker, an autorecloser, fluid-filled transmission line, and/or combinations thereof.

DEFINITIONS

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, is from 100 to 1,000, then the intent is that all individual values, such as 100, 101, 102, etc., and subranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

"Acidity" is measured by titrating a known volume of oil with a solution of alcoholic KOH to the neutralization point. The weight of the oil in grams per mg KOH is referred to interchangeably as the acidity number or the neutralization number. The acidity is determined using ASTM test method D 974.

"Antioxidant" is a molecule capable of slowing or preventing the oxidation of other molecules.

"Blend," "fluid blend" and like terms is a blend of two or more fluids, as well as blends of fluids with various additives. Such a blend may or may not be miscible. Such a blend may or may not be phase separated. Such a blend may or may not contain one or more domain configurations, as determined from light scattering, and any other method known in the art.

"Composition" and like terms is a mixture or blend of two or more components.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Dielectric breakdown voltage" is a measure of a liquid's ability to withstand electric stress without failure. The dielectric breakdown voltage serves to indicate the presence of contaminating agents such as water, dirt, cellulosic fibers, or conducting particles in the liquid, one or more of which may be present in significant concentrations when low breakdown voltages are obtained. However, a high dielectric breakdown voltage does not necessarily indicate the absence of all contaminants; it may merely indicate that the concentrations of contaminants that are present in the liquid between the electrodes are not large enough to deleteriously affect the average breakdown voltage of the liquid. Dielectric breakdown voltage is measured in accordance with ASTM D 1816.

"Dielectric fluid" is a non-conducting fluid having a dielectric breakdown greater than 20 kV as measured in accordance with ASTM D 1816 (VDE electrodes, 1 mm gap) or a dissipation factor of less than 0.2% as measured in accordance with ASTM D 924 (60 Hz, 25° C.), and less than 4 at 100° C. (ASTM D 924, 60 Hz). A dielectric fluid provides coolant or insulative properties when placed in operative communication with an electrical component.

"Dielectric strength" or "dielectric breakdown" (in MV/m or kV/mm) is the maximum electric field strength that a dielectric fluid can withstand intrinsically without breaking down. The dielectric strength is measured by taking 100-150 ml oil sample in a test cell and applying a voltage between test electrodes separated by a specified gap. The breakdown voltage is noted in volts per millimeter. The test is preferably run five times and the average value is calculated. The dielectric strength is determined using ASTM D 1816 or ASTM D 877.

"Dissipation factor" is a measure of the electrical loss due to conducting species and is tested by measuring the capacitance of fluids in a test cell using a capacitance bridge. The dissipation factor is determined using ASTM D 924.

"Electrical conductivity" is measured using a conductivity meter such as an Emcee meter. The electrical conductivity is determined in accordance with ASTM D 2624.

"Flash point" is the temperature of the fluid that will result in an ignition of the fluid's vapors when exposed to air and an ignition source. The flash point is determined by placing a fluid sample in a flashpoint tester and determining the temperature at which it ignites in accordance with ASTM D 92.

"Fire point" is the temperature of the fluid at which sustained combustion occurs when exposed to air and an ignition source. Fire point is determined in accordance with ASTM D 92.

A "lipid" is a class of hydrocarbon that is soluble in nonpolar solvents (such as ether and chloroform) and is relatively or completely insoluble in water. Lipid molecules have these properties because they consist largely of long hydrocarbon tails which are hydrophobic in nature. Examples of lipids include fatty acids (saturated and unsaturated); glycerides or glycerolipids (such as monoglycerides, diglycerides, triglycerides or neutral fats, and phosphoglycerides or glycerophospholipids); nonglycerides (sphingolipids, sterol lipids including cholesterol and steroid hormones, prenol lipids including terpenoids, fatty alcohols, waxes, and polyketides); and complex lipid derivatives (sugar-linked lipids, or glycolipids, and protein-linked lipids). "Fats" are a subgroup of lipids called "triacylglycerides."

"Oxidation" is a chemical reaction that transfers electrons from a substance to an oxidizing agent. Oxidation reactions can produce reactive free radicals, which can degrade a composition. Antioxidants can terminate free radicals.

"Pour point" is the lowest temperature at which a liquid will pour or flow under prescribed conditions. The pour point is determined by cooling an oil sample with dry ice/acetone and determining the temperature at which the liquid becomes a semi-solid. The pour point is determined using ASTM D 97.

"Viscosity" is the measurement of the resistance of a fluid to flow. Viscosity is measured in accordance with ASTM D 445, Brookfield-Viscometer.

"Water saturation point" is the percentage of saturation of water in the dielectric fluid. The water saturation point is a function of the temperature and chemical structure of the dielectric fluid. As the water saturation point increases, the dielectric strength generally decreases. The water saturation point is determined by placing a sample to be tested into a sealed test vessel equipped with a stirrer and applying heat to the liquid. A moisture-in-oil sensor capable of measuring relative saturation (% RS) and temperature is inserted into the test vessel. Testing is conducted at the given temperatures. At each temperature, the actual temperature and relative saturation values are recorded directly from the moisture-in-oil sensor and a sample is removed for determination of the total water content of the fluids by the Karl Fischer titration and measured in accordance with ASTM Method D1533. The unit measure of the water is in parts per million (ppm).

Some embodiments of the present disclosure will now be described in detail in the following Examples.

EXAMPLES

1. Preparation of GEMO

For each of GEMO 1 and GEMO 2, genetically engineered microbial oil is produced by way of a fermentation process. The genetically engineered microorganism is heterotrophic microalgae from the genus *Chlorella*. The carbon source is sucrose.

2. Preparation of Dielectric Fluid

The following procedure is used to prepare Dielectric Fluid 1 (with GEMO 1) and Dielectric Fluid 2 (with GEMO 2)

The GEMO is heated in a glassware set-up in a constant water bath at 70° C. To the GEMO is added a phenolic antioxidant stabilizer. The GEMO composition is stirred with a magnetic bar to dissolve the antioxidant at 70° C., and a vacuum pressure is applied for 1 hour to remove moisture. After cooling to room temperature, the GEMO composition is filtered over 1 micron filter paper with a filtration apparatus to remove any particulates and foreign impurities and waxy components. The resultant dielectric fluid containing the GEMO and antioxidant meets the requirements for transformer fluid in accordance with IEEE C57.147. The components of the GEMOs and the properties of the dielectric fluids are provided in Tables 3-6 below.

Table 3 shows the components of GEMO 1.

TABLE 3

| GEMO 1 | |
|---|---|
| Major Fatty Acids, % of oil (relative) | Wt % |
| C14:0 Myristic | 1.1 |
| C16:0 Palmitic | 13.8 |
| C16:1 Palmitoleic | 0.82 |
| C18:0 Stearic | 3.2 |
| C18:1 Oleic | 67.5 |
| C18:2 Linoleic | 11.5 |
| C18:3 alpha-Linolenic | 0.64 |
| C20:0 Arachidic | 0.32 |
| C20:1 Eicosenoic | 0.2 |
| C22:0 Behenic | 0.13 |
| Small glyceride | 0.1-30 |
| Oligosaccharide | 0-100 ppm | wt % based on total weight of GEMO

Table 4 below shows that Dielectric Fluid 1 (with GEMO 1) passes the chemical, physical, and electrical properties criteria as transformer fluid in accordance with IEEE C57.147.

TABLE 4

| Dielectric Properties for Dielectric Fluid 1 (GEMO 1) | | | |
|---|---|---|---|
| Properties | Test Method | Passing value | Dielectric Fluid 1 |
| Fire Point, ° C. | ASTM D92 | >300 | 360 |
| Viscosity @ 40° C., cSt | ASTM D445 | <50 | 38.5 |
| Viscosity @ 100° C., cSt | ASTM D445 | <15 | 8.32 |
| Pour Point, ° C. | ASTM D97 | <−10 | −12 |
| Neutralization Number, mg KOH/g | ASTM D974 | <0.06 | 0.017 |
| Dielectric Strength, 1 mm gap, kV | ASTM D1816 | >20 | 30.42 |
| Power Factor at 25° C., % | ASTM D924 | <0.2 | 0.010 |
| Power Factor at 100° C., % | ASTM D924 | <4.0 | 0.102 |

Tables 5-6 show the components of GEMO 2 and the properties of Dielectric Fluid 2 (with GEMO 2).

TABLE 5

| GEMO 2 | |
|---|---|
| Composition | wt % |
| C18:1 | 80.23 |
| C18:2 | 8.34 |
| C18:3 | 0.25 |
| C10~C24 saturated components | 9.23 |

TABLE 5-continued

GEMO 2

| Composition | wt % |
|---|---|
| Monoglyceride* | 0.01 |
| Diglyceride* | 0.83 | wt % based on total weight of GEMO
*AOCS Cd 11d-96 (American oil chemist society): Amount of monoglyceride and diglyceride determined by high pressure liquid chromotagraphy-evaporative light scattering detector (HPLC-ELSD).

Table 6 below shows that Dielectric Fluid 2 (with GEMO 2) passes the chemical, physical, and electrical properties criteria as transformer fluid in accordance with IEEE C57.147.

TABLE 6

Dielectric Properties for Dielectric Fluid 2 (GEMO 2)

| Properties | Test method | Passing value | Dielectric Fluid 2 |
|---|---|---|---|
| Fire point, C. | ASTM D92 | >300 | 358 |
| Viscosity @ 40 C., cSt | ASTM D445 | >50 | 38.4 |
| Viscosity @ 100 C., cSt | ASTM D445 | <15 | 8.3 |
| Pour point, C. | ASTM D97 | <−10 | −21 |
| Nuetralization number, mg KOH/g | ASTM D974 | <0.06 | 0.019 |
| Dielectric strength, 1 mm gap, kV | ASTM D1816 | >20 | 26 |
| Power factor at 25 C., % | ASTM D924 | <0.2 | 0.05 |
| Power factor at 100 C., % | ASTM D924 | <4.0 | 1.16 |

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A dielectric fluid comprising:
   (i) a genetically engineered microbial oil (GEMO) comprising
   a triglyceride,
   from 0.1 ppm to 100 ppm of an oligosaccharide and
   from 0.81 wt % to 0.90 wt % of a small glyceride comprising a glycerol molecule covalently bonded to at most two fatty acid chains by way of ester linkages; and
   (ii) an antioxidant; and
   the dielectric fluid has a water saturation point from 3800 ppm to 4200 ppm at 90° C. as measured in accordance with ASTM D 1533.

2. The dielectric fluid of claim 1 wherein the amount of small glyceride is within a range from 0.1 wt % to 30 wt %, based upon GEMO weight.

3. The dielectric fluid of claim 1 wherein the GEMO comprises at least 60 wt % oleic acid.

4. The dielectric fluid of claim 1 wherein the GEMO comprises greater than 65 wt oleic acid and less than 15 wt % linoleic acid.

5. The dielectric fluid of claim 1 comprising a heterogeneous triglyceride.

6. The dielectric fluid of claim 1 wherein the antioxidant is selected from the group consisting of a phenolic antioxidant and an amine antioxidant.

7. The dielectric fluid of claim 1 comprising an additive selected from the group consisting of an oxidation inhibitor, a corrosion inhibitor, a metal deactivator, a pour point depressant, and combinations thereof.

8. The dielectric fluid of claim 1 wherein the dielectric fluid has a pour point less than −10° C. as measured in accordance with ASTM D 97.

9. A device comprising:
   an electrical component; and
   a dielectric fluid in operative communication with the electrical component, the dielectric fluid comprising (i) a genetically engineered microbial oil (GEMO) comprising
   a triglyceride,
   from 0.1 ppm to 100 ppm of an oligosaccharide and
   from 0.81 wt % to 0.90 wt % of a small glyceride comprising a glycerol molecule covalently bonded to at most two fatty acid chains by way of ester linkages and (ii) an antioxidant; and
   the dielectric fluid has a water saturation point from 3800 ppm to 4200 ppm at 90° C. as measured in accordance with ASTM D 1533.

10. The device of claim 9 wherein the dielectric fluid has a pour point less than −10° C. as measured in accordance with ASTM D 97.

11. The device of claim 9 wherein the dielectric fluid further comprises a blend component selected from the group consisting of a vegetable oil, a seed oil, a mineral oil, a silicone fluid, a synthetic ester, a poly alpha olefin, and combinations thereof.

12. The device of claim 9 wherein the electrical component comprises a cellulose-based insulation material in contact with the dielectric fluid.

13. The device of claim 9 wherein the electrical component is selected from the group consisting of a transformer, a capacitor, a switch, a regulator, a circuit breaker, a recloser, a fluid-filled transmission line, and combinations thereof.

14. The device of claim 9 wherein the electrical component is a transformer and the dielectric fluid is in the transformer.

15. A dielectric fluid comprising:
   (i) a genetically engineered microalgae oil comprising
   a triglyceride,
   from 0.1 ppm to 100 ppm of an oligosaccharide and
   from 0.81 wt % to 0.90 wt % of a small glyceride comprising a glycerol molecule covalently bonded to at most two fatty acid chains by way of ester linkages; and
   (ii) an antioxidant; and
   the dielectric fluid has a water saturation point from 3800 ppm to 4200 ppm at 90° C. as measured in accordance with ASTM D 1533, and a viscosity less than 50 cSt at 40° C. as measured in accordance with ASTM D445.

* * * * *